United States Patent [19]

Greneker, III

[11] E Re. 29,183

[45] Reissued Apr. 12, 1977

[54] TELEPHONE RANGE EXPANDER

[76] Inventor: Gene Greneker, III, 2546 Wilson Woods Drive, Decatur, Ga. 30033

[22] Filed: Aug. 19, 1974

[21] Appl. No.: 498,638

Related U.S. Patent Documents

Reissue of:

[64] Patent No.: 3,721,771
Issued: Mar. 20, 1973
Appl. No.: 884,505
Filed: Dec. 12, 1969

[52] U.S. Cl. ..... 179/41 A
[51] Int. Cl.[2] ..... H04M 3/06
[58] Field of Search ..... 179/41 A; 325/55, 64

[56] References Cited

UNITED STATES PATENTS

| | | | |
|---|---|---|---|
| 2,564,660 | 8/1951 | Allen | 179/41 A |
| 3,050,591 | 8/1962 | Dimmer | 179/41 A |
| 3,193,623 | 7/1965 | Burns et al. | 179/41 A |
| 3,254,159 | 5/1966 | Condict | 179/41 A |
| 3,366,880 | 1/1968 | Driver | 179/41 A |

*Primary Examiner*—Thomas A. Robinson
*Attorney, Agent, or Firm*—B. J. Powell

[57] ABSTRACT

An extension telephone is coupled to a telephone line through a control unit which receives and forwards by radio incoming calls and is fully controlled from the extension unit for outgoing calls. Incoming calls ring the remote mobile unit which is then coupled for conversation to the line through a control unit actuated from the extension unit. The mobile unit transmits actuation and dialing signals to the control unit for outgoing calls from the mobile unit in response to successively transmitted tone modulations to dial any party on the telephone line and thereupon connects the mobile microphone and receiver directly to the line.

16 Claims, 7 Drawing Figures

3 Sheets-Sheet 1

TELEPHONE RANGE EXPANDER
Filed Dec. 12, 1969 3 Sheets-Sheet 1
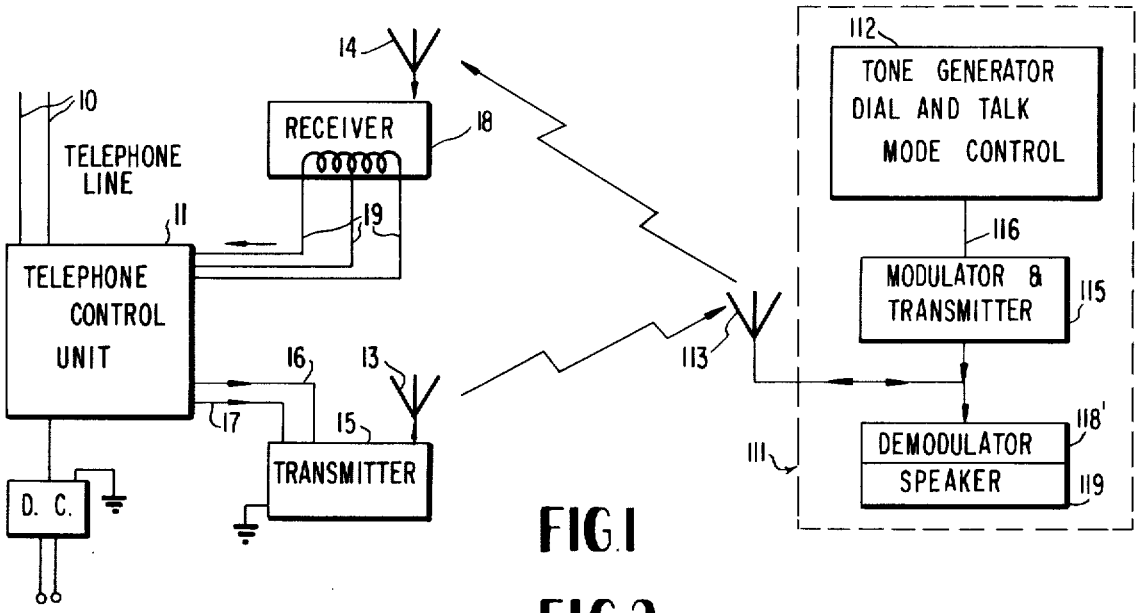
FIG.1
FIG.2
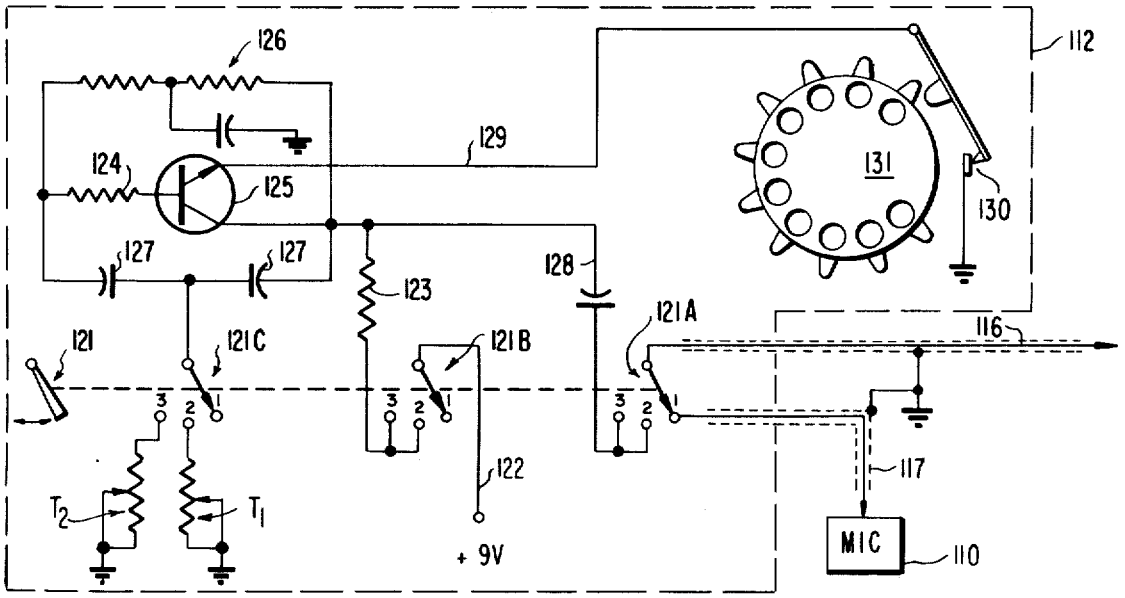
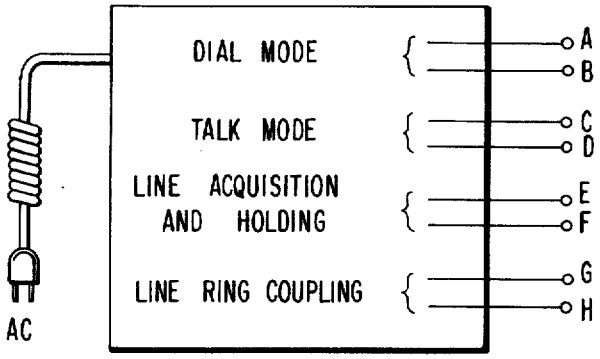
FIG.3D
INVENTOR
GENE GRENEKER, III
BY Beveridge & De Grandi
ATTORNEYS RECEIVER
TRANSMITTER
D.C. INPUT
MANUAL ADVANCE SWITCH
MANUAL RESET SWITCH
RINGING AUDIO OSCILLATOR
AUTOMATIC VOLUME CONTROL CIRCUIT
DIAL RELAY DRIVER
RINGING CIRCUIT
RESET COIL
ADVANCE COIL
AUTOMATIC RESET DELAY RELAY
A.C. POWER
D.C. POWER SUPPLY FIG. 3A
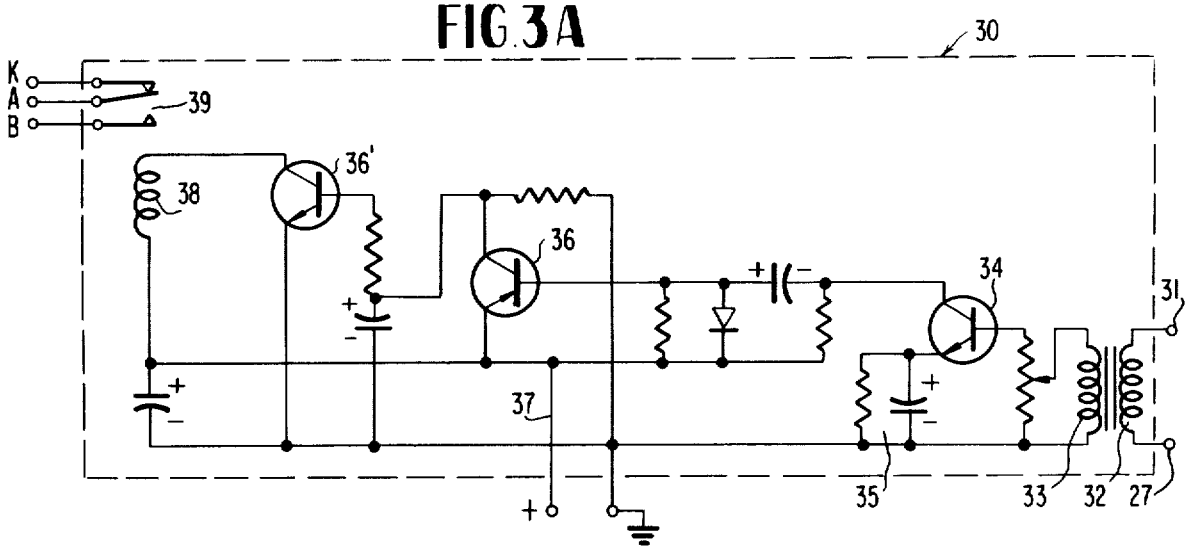
FIG. 3B
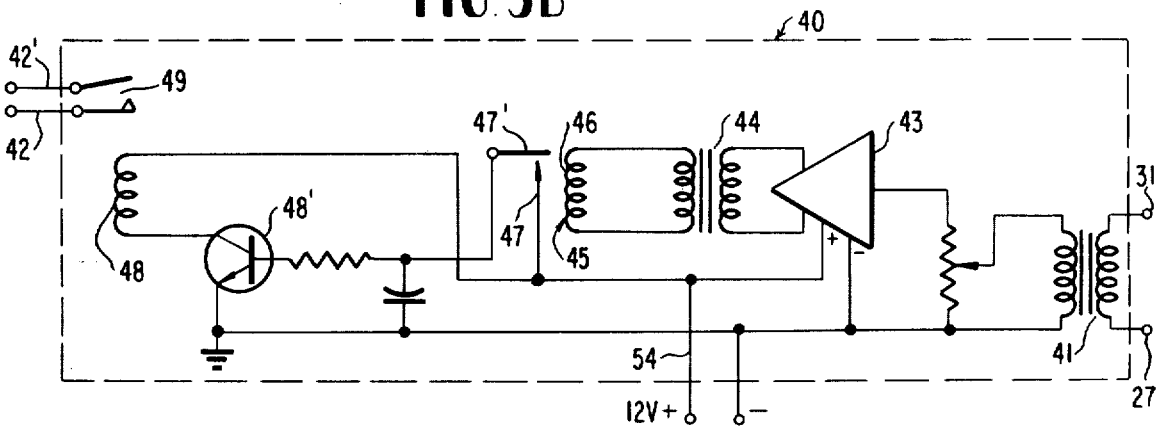
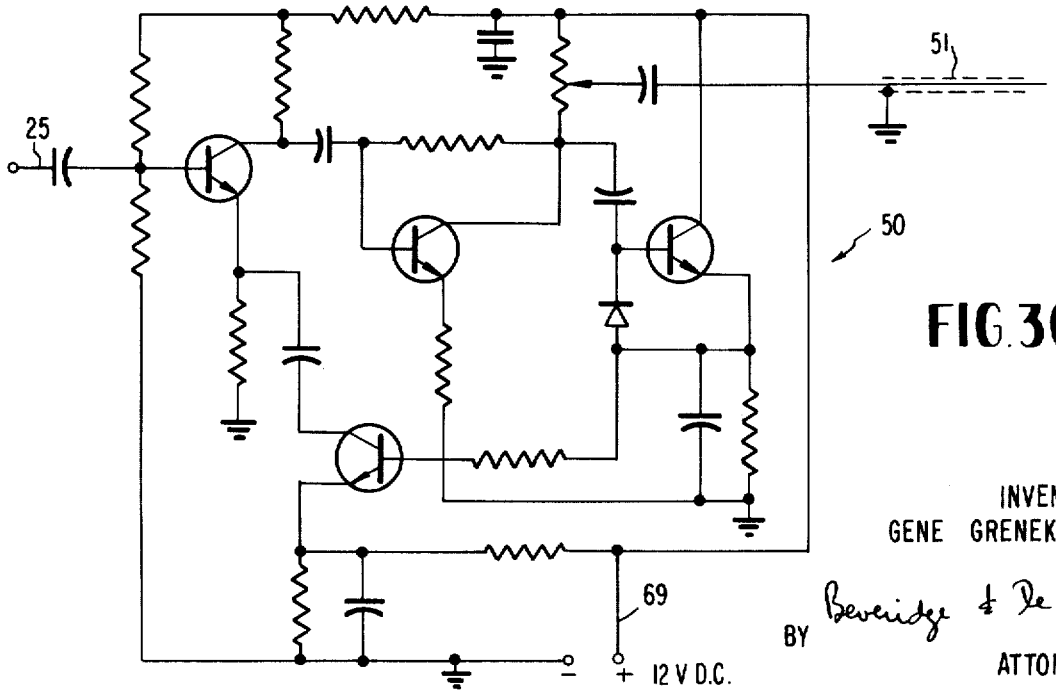
FIG. 3C
INVENTOR
GENE GRENEKER, III
BY Beveridge & De Grandi
ATTORNEYS

TELEPHONE RANGE EXPANDER

Matter enclosed in heavy brackets [ ] appears in the original patent but forms no part of this reissue specification; matter printed in italics indicates the additions made by reissue.

In seeking means to extend the range of calling at a local telephone, a number of prior arrangements have been devised to permit mobile operation through a connection to land lines. Typical of these are U.S. Pat. Nos. 3,009,149, 3,087,998, 3,124,657, and 3,193,623. Each of the proposed systems has certain disadvantages, usually lacking the complete control of the subscriber's terminal by the mobile unit, which in most such systems is subordinate to a terminal unit where line connection is made or has other objectionable features such as excessive band width requirements for a radio link between the mobile unit and terminal or land line coupler.

The first mentioned patent is basically a control system for selecting which of a number of mobile units at a station is to be called by the line terminal station, rather than an extender of the range of operation desired for a particular subscriber's telephone. The second patent is somewhat similar to the first except that the unit acquires telephone lines and supplies digital dialing information through the transmission of a combination of simultaneous tones, while the third patent operates by radio to couple a remote transmitter to a telephone line, but transmission to the user is by radio loudspeaker signal which may be unintelligible in a high ambient noise location. The dialing cycle in this unit is accomplished by interrupting the radio frequency signal and is accordingly subject to frequent error as such a signal has no distinct recognizable coding and may be interrupted or lost momentarily. Additionally, line acquisition depends on constant presence of R.F. signal; thus, a fade or interference signal may lose telephone line acquisition, thus losing the party instead of a mere syllable. The final patent mentioned is a duplex transmitter and receiver for a mobile unit employing a 10 kHz continuous modulation to acquire and hold connection through the fixed station to the telephone line. While this system operates to call mobile units and to permit calls from the mobile unit, both for ringing and talking, it has a number of disadvantages, including the fact that if the signal containing the 10 kHz. line acquisition tone fades, after a brief delay, line acquisition will be lost; thus the conversation will be involuntarily terminated. Additionally disadvantageous is the requirement of excessive band width when in the talk mode and excessive power for a mobile unit, due to the fact that the receiver, transmitter, and tone circuits must operate simultaneously while the unit is in operation.

It is an object of this invention to provide a remote mobile unit in which a subscriber's control of a telephone line is the same as in an ordinary connected telephone, but in which the line coupling control is completely effective from the mobile unit.

Another object of the invention is to provide improved switching arrangements for control of access to the line for dialing and talk modes and for resetting by radio from a small mobile unit carried by the user.

A further object of the invention is to provide a remote telephone coupler controllable by the user with minimum power consumption and an improved reliability of caling and receiving calls in a dial system.

A still further object of the invention is to provide user controlled apparatus for connecting a mobile unit to a subscriber's telephone terminal connection to a telephone line by short wave radio.

These and other objects of the invention will be perceived as the description proceeds in relation to the drawings in which:

FIG. 1 is a block diagram of a system according to this invention;

FIG. 2 is a block diagram of a user's "walkie-talkie" unit showing modification for extension phone use;

FIG. 3A is a schematic diagram of a dial relay driver;

FIG. 3B is a schematic diagram of a tone decoder;

FIG. 3C is a schematic diagram of an A.V.C. circuit suitable for use in an audio input circuit to the transmitter of FIG. 3; and FIG. 3D is a schematic diagram showing connections for the control unit of FIG. 3 to a line through a telephone company-supplied coupler.

Figure 3:
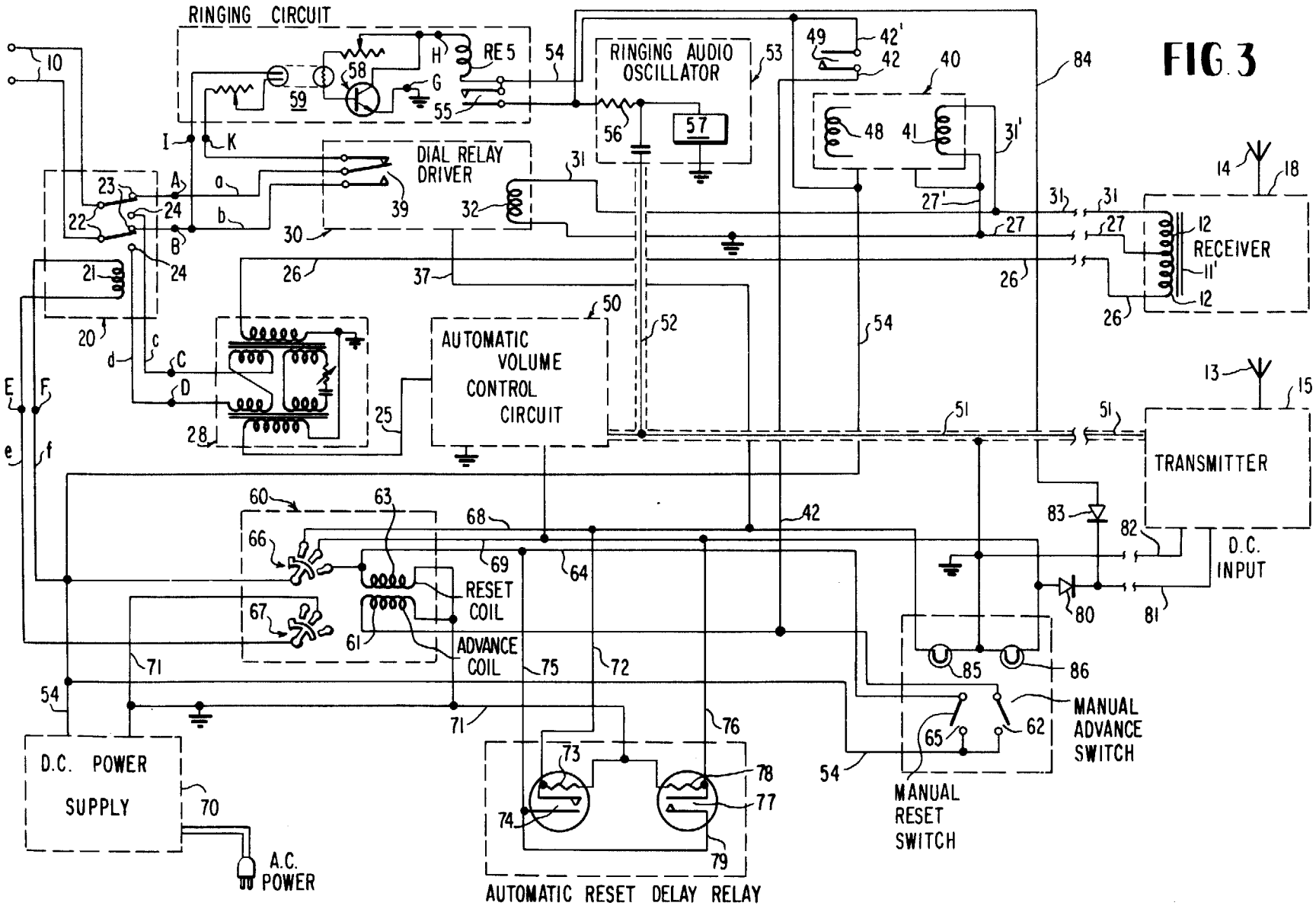
FIG. 3 is a block diagram of transmitter, receiver and control units compatible with apparatus of FIG. 2, including schematic circuitry in part.

A subscriber's desk or wall telephone is replaced by or supplemented by a terminal including a transmitter, receiver and control unit connected directly to the line in the same way as a conventional user's phone, or is connected to a line coupler supplied by the telephone company which is in turn connected to the line. This control unit operates a transmitter for incoming call ringing and talk modes and is operated to switch to and from both ring and talk modes by received mobile unit control pulsing for both incoming and outgoing calls, the linkage for transmitting and receiving between mobile and terminal units being by radio or other variable path medium. A complete control of the terminal unit from the mobile unit for outgoing calls and for incoming calls after ringing is provided by a pair of generated tones, one to perform switching, and the other to effect transmission of dialing pulses over the line under the control of the mobile conventional dial signal interrupter. Repeated sequential transmissions of the first tone steps a switching mechanism in the terminal control unit to connect and disconnect the terminal transmitter and receiver for the talk mode and to make and break connections for outgoing call line acquisition. As a preferred embodiment the transmisson between mobile and terminal units is by conventional short wave radio apparatus operating in the Citizen's Band employing no more than 200,000 Hz., total receiver transmission separation, while sending and receiving simultaneously. Total band width of either transmitter is limited to the highest voice frequency used, in this case 3.5 kHz. Only one of the generated tones is used at any one time, neither being required when the talk mode connections are effected. A return-to-standby is effected automatically upon failure to complete the enabling connections and upon completion of a call or at a predetermined time for cancellation.

Referring now to FIG. 1 there is shown in block diagram an extension system wherein connection to a telephone line 10 is effected through a telephone control unit 11 powered by a DC source such as 12 volts supplied from an AC line. Control unit 11 is effective to transmit ringing pulses and telephone messages by means of a transmission medium coupler 15, illustratively a radio antenna for broadcasting in the immediate area a modulated radio frequency signal such as the Citizen's Band frequency near 27 MHz. Control unit 11 further has a signal-receiving coupler such as a radio receiver having antenna 14. When propagation between the control unit and the user's hand-held unit is via radio, as illustrated, conventional transmitter 15 is connected between antenna 13 and the control unit 11, and serves to transform audio output on line 16 to a modulated radio frequency output at antenna 13. As will be further described hereinafter the energization of transmitter 15 is effective intermittently, according to the signal to be transmitted, by selective energization of transmitter 15 via line 17 from the control unit. Receiving coupler 14, when transmission is by radio, includes a conventional radio receiver 18 comprising the usual tuning circuit and demodulator to provide an output by way of leads 19 in manner to be later described.

A portable telephone extension is shown generally at 111 which comprises a suitable package for hand holding, or for suspending by a shoulder strap, or the like. Unit 111 consists essentially of a mode switch 121, a dialing switch 130 and a tone generator 112 producing two tones alternatively for actuating dialing functions by way of control unit 11, and switching mechanisms to enable the extension phone to control unit 11, which then activates the extension phone so that the subscriber's station is connected to telephone line 10.

This unit comprises a "walky-talky" type radio to which is added circuitry generally illustrated in FIG. 2, including mode switch 121 having three banks of three positions each shown at 121A, 121B, and 121C. When switch 121 is on position 1 a direct connection is made between the user's microphone 110 at line 117 and the audio input to the walky-talky transmitter shown at line 116. In this position the user talks directly with anyone connected to the line through control unit 11. Antenna unit 113 serves both as a transmitting and receiving antenna cooperating with antennae 13 and 14.

Mode switch 121 is manually operable by the user to connect his transmitter and receiver through unit 11 to line 10, to control the tone generator, and to switch functions in unit 11. Tone generator 112 produces two distinct tones as switch 121 is operated to positions 2 and 3 to dial a number and switch the control unit to the talk mode. On position 2 a first frequency such as 400 Hz. is generated and transmitted for switching functions in unit 11 and on position 3 a second frequency such as 350 Hz. is generated and transmitted to unit 11, to operate therein a dialing relay to provide a telephone line dialing pulse when interrupted once for each dial position passed in one direction of dial movement as the operator dials his desired party at hand-held unit 111. When a line has been signalled, mode switch 121 is again operated to produce the first frequency a second time for switching to connect power to transmitter 15 for conveying the receiving telephone line voice signals via transmitter 15, antenna 13, antenna 113 and demodulator 118, producing an audio signal in receiver 119. When the conversation is completed switch 121 is again operated to clear the line by generation of the first tone a third time, for a switching, clearing action in unit 11.

Initiation of a telephone call from the extension phone occurs as the operator advances switch 121 to position 2 thereby connecting a DC voltage such as 9 volts on supply line 122 via load resistor 123 to the collector of a twin-T transistor oscillator circuit having a base bias resistance 124, transistor 125, biasing resistor/capacitor network 126, and frequency tuning capacitor network 127 connected to the wiper of switch 121C.

In position 2 a variable resistor shown at $T_1$ is set to produce, in cooperation with the capacitors 127, a first frequency of oscillation which is passed by line 128 to switch bank 121A and thence to the audio input 116 for the transmitter. Whenever switch 121 is on either position 2 or 3 the power is supplied to 125 via 123. After a brief dwell on position 2 the switch 121 is advanced to position 3, and a second tone is generated under control of $T_2$. The second tone is passed by the transmitter to receiver 18 and operates to pulse telephone line 10. Since conventional telephone line dialing is accomplished by a line short being interrupted once for each dial position passed over, and translated at the central switching office into a line selection, a like function is here provided. The second tone, controlled at $T_2$, provides a line shorting signal that is pulsed off by interrupting the current flowing to a ground return circuit connected to the oscillator emitter by way of line 129 and normally closed dial switch 130. The walkie-talkie unit carries a a dial mechanism like that of the usual desk telephone, not shown. This dial mechanism includes a switch actuator illustrated in FIG. 2 at 131 which cooperates with a normally closed switch 130 in a conventional manner to interrupt the dial signal each time the dial actuator 131 passes one of the dialing positions, causing switch 130 to open and form a dial pulse. The dial tone signal being transmitted from unit 111 to unit 11 causes a switch to close across line 10. Thus, when the dial is moved to the "0" position and allowed to return to the rest position there will be ten interruptions of the ground return circuit to the emitter of transistor oscillator 125. This effectively provides 10 interruptions of the switch shorting line 10, as in normal telephone dialing.

Referring now to FIGS. 3, 3A, 3B, and 3C, control unit 11 will be described for one embodiment of the invention in which the control unit is connected directly to telephone line 10. In a second embodiment of the invention a conventional telephone-company-supplied coupler unit is employed with only slight changes in the circuitry of FIG. 3, this being shown in FIG. 3D. When direct connection is made to the line a line switch or relay 20 is utilized to make connection between line 10 and the ringing circuit or the talking circuit in accordance with operation of the user's unit. A relay coil 21 operates a pair of switch arms connected to points 22 and to the line 10. A pair of ringing circuit connections are made at points 23 of switch 20 which are normally closed except in the talk mode. Lines c and d connect line 10 to the transmitter and receiver in the talk mode via pair of contacts 24, normally open and arranged to be closed when relay 20 is operated. In the unactuated position of relay 20 lines a and b connect to points 23 and thence through points 22 to the line, while lines c and d connect to points 24 and thence to the line. Relay 20 is operated by voltage applied between lines e and f in accordance with the position of a stepping relay later to be described. Points A, B, C, D, E and F are points of disconnection of relay 20 and of connection to the previously mentioned line coupler. The line coupler is supplied by the telephone company when the regulations of the company require the control unit 11 being connected at points G and H to introduce ringing pulses to unit 11, then supplying the actuating pulses for initiating coupler output to the line.

For an incoming call a ringing pulse arriving on line 10 is passed through points A and B of lines a and b. Since lines a and b extend to normally open switch 39 of dial relay driver 30 no effect is produced thereby within the control unit. However, the line sees a load through the normally closed contacts of switch 39, lines extending to a ring initiator circuit passing in one case from point B through a disconnect point I to a ring control circuit and through point A and the normally closed pair of contacts on switch 39 thence through disconnect point K to the other terminal of the ring actuator circuit to produce a further ring signal for transmission to the receiver unit. Loading of line 10 during the stand-by mode of unit 11 is undesirable because, ideally, line 10 should be presented no resistive load while idle, or while passing the conventional AC pulse, used for ringing by the telephone company, yet a circuit must be provided to recognize a ringing pulse on line 10. These conditions are satisfied in the present circuit 59 by use of a neon bulb which provides almost no resistive load until fired, in this case by the ringing voltage. The neon bulb is across line I–K, hence is operated by a line ring pulse, and the light output is piped to a photocell to initiate a ring signal transmission to unit 11 at points G and H inasmuch as the telephone company-supplied coupler supplies a switch closure during the ring cycle at G and H when connected as described, obviating the need for the ringing signal generator shown. In this case circuits are also broken at I and K, the normally closed switch portion at 39 being left unconnected when the line coupler is employed.

When relay 20 is operated and points 22 are connected to points 24 lines c and d are connected to a conventional hybrid telephone transformer generally as indicated at 28 and as conventionally used in a two line to four line telephone circuit termination, as in present commercial practice. This hybrid transformer has a high impedance output at line 25 extending to the automatic volume control circuit 50 and to the transmitter 15 of the present invention. Receiver 18 develops a balanced output in a center-tapped-to-ground transformer 11' during all modes including standby.

When the user operates switch 121 to position 2 to initiate a call, a first tone is generated and transmitted and will be received and demodulated in receiver 18 and the balanced audio output produced in winding 12 of output transformer 11' will be conveyed by line 26 to the hybrid coil input windings 28, line 27 being the center tap audio ground return. The output signal, however, does not produce on line 10 any output for the reason that neither dial relay driver 30 nor relay 20 is energized and only non-resistive-terminated lines a, b, I and K are connected to line 10.

At the same time, the demodulated signal from receiver 18 passes through the top winding 12 of balanced output transformer 11', extending through branch lines 27 and 31 to the dial relay driver unit shown generally at 30, illustrated more specifically in FIG. 3A. An input transformer having input winding 32, connected at 27 and 31, has output winding 33 to an amplifier 34 suitably biased at 35 having undirectional output coupled to amplifier 36 and 36' to operate a relay coil 38 in control of switch 39. Thus, when tone 2 is received at 18, relay switch 39 is operated to close a connection across line 10 when relay 20 is not yet operated, and to open the circuit between A and K at the normally closed contacts of switch 39.

At the same time, the demodulated signal from receiver 18 is passed from transformer 11' via winding 12, line 31 and branch lines 27' and 31' to a frequency disciminating circuit shown in FIG. 3B at 40 having input via transformer 41 and output at lines 42 and 42'. Input extends to amplifier 43 and transformer 44 in control of a resonant reed circuit generally shown at 45, comprising an actuate coil 46 and a moveable reed 47 which makes intermittent contact at 47' when the input frequency corresponds to the reed frequency so that a resonant condition exists. This provides actuation voltage for relay coil 48, closing normally open contacts 49. Rapid response is achieved by use of amplifying means at 48', which may be biased into conduction by voltage applied at 47', preferably smoothed by a suitable high value of capacitance to maintain relay coil 48 energized whenever the resonant condition is satisfied. Circuit 40 as illustrated operates whenever tone controlled by $T_1$ is generated at the user's unit 111 and impressed on line 31, closing switch 49 and connecting line 42 to line 42' which connects to power lead 54, thus applying power to lead 42 for actuation of the stepping switch to connect line 10 to lines c and d and to actuate the transmitter in the talk mode.

When receiver 18 obtains demodulated output on lines 26 and 31 according to any product generated at unit 111 hybrid coil 26 would pass this product to lines c and d which would pass to line 10 if actuation of a stepping switch to position 2 had occurred to provide operation of relay 20. In the ringing mode this has not yet occurred. The telephone line output voltage appears at the output of the hybrid coil 28 and would return a strong signal to unit 111 through transmitter 15 via line 25 but is not effective since 15 is not energized. Automatic volume control circuit 50, shown in more detail in FIG. 3C, operates to produce a regulated audio ouptut at line 51. This circuit standardizes the audio input for the transmitter but is not described in detail since it is conventional and may be varied according to operating characteristics which may be desired.

When an incoming ring signal arrives by line 10 it is necessary to convey this signal by way of transmitter 15 to unit 111 to produce a ringing signal at receiver earphones 119. An incoming ring signal appearing at points A and B is passed by normally closed contacts of switch 39 and produces an output signal by operation of relay Re 5 and oscillator 53 to line 52 connected to audio output line 51. This ringing signal is produced by a conventional oscillator 53 as switch 55 closes on operation of Re 5 to apply power from line 54 to oscillator 53, a conventional oscillator tuned to a frequency suitable for operating the desired buzzing signal at speaker 119 of unit 111. This oscillator includes a load resistor 56 connected through switch 55 to power lead 54 whenever Re 5 is operated. A suitable transistor oscillator shown generally at 57 has a resistance-capacitance network for generating a signal in the audio range connected to output lead 52. The neon bulb converts the AC ringing signal to light and photocell 58' reconverts the light impulses back into an analog electrical signal. As light of the neon bulb strikes the photocell 58' its resistance lowers, allowing current to pass to the base of transistor-amplifier 58, driving it to conduction to power Re 5 to operate ring circuit 59. There is thus provided means of ringing extension phone 111 and for dialing a number at phone 111 to effect the closing of switch 49 whenever the first tone is generated under the control of $T_1$ when switch 121 is on position 2. When switch 121 is advanced to position 3 a different tone under the control of $T_2$ is generated which is not of a frequency accepted by 45 to close switch 49. However, a brief or momentary operation of switch 49 is sufficient to actuate step-switching of the control unit one step each time it occurs. Such an operation is effected each time manual switch 121 is advanced to position 2, or passes position 2 in returning to position 1 for connecting user's microphone to his transmitter. As the user desires to commence dialing he advances switch 121 to position 3 and produces dialing pulses of the second frequency by operation of dial 131. Upon completion of dialing he returns switch 121 to position 1 contacting position 2 in passing, and his microphone is again connected to line 116 for the talk mode. The first tone is again produced as he passes position 2 to provide a second connection of line 42 to the power lead 54. This provides the desired second stepping pulse for a stepping switch in control unit 11.

A stepping switch suitable for switching in control unit 11 is shown at 60 in which advance coil 61 is connected to line 42 and to system ground. Thus, closing switch 49 serves to step relay 60 one step each time the first tone is received at circuit 40. Alternatively, a push-button switch 62 may make connection between the power lead 54 and line 42 for energizing coil 61 when it may be desired to control unit 11 manually. Stepping relay 60 also has a reset coil 63 arranged in conventional telephone stepping switch manner to return switch 60 to its normal position after one or more steps have been made. Reset coil 63 connects to system ground and to an automatic reset delay relay later to be described. It also connects to a push-button reset switch 65 for manual control in the same manner as advance coil 61. Stepping relay 60 is provided with two contact and wiper banks 66 and 67 having wipers connected to power lead 54 and point E in line e to relay 20, and wherein wipers may be in normally off position or in actuated positions 1, 2 or 3. When advance coil 61 has been operated once, wiper 66 is on contact 1 of the upper bank to provide DC power supply to line 68 which connects to energize dial driver 30 and to operate the dial light 85 to indicate that the user's unit has been placed in the dialing mode. In position 1 power is not connected to transmitter 15 since only the one first tone signal has been actuated at the unit 111 to prepare the unit for dialing. However, a second pulse is received on line 42 by reoperation of switch 49 and the upper and lower wipers 66 and 67 advance to position 2 to provide power on line 69, to operate indicator light 86, and to apply power through diode 80 to transmitter power input line 81, ground being applied by return line 82. At the same time, wiper 67 contacts a ground connection to supply ground return on line e for energization of relay 20 in order to connect line 10 through hybrid transformer 28 and automatic volume control 50 to provide talk mode audio input to the transmitter 15. When the user at unit 111 wishes to terminate the conversation or clear the line a third pulse is transmitted to 18 and passed to 40 then to line 42 by reoperation of switch 49. The upper and lower wipers advance to switch position 3, to provide power on line 63'. This power actuates reset coil 63 causing relay 60 to return, thus returning unit 11 to the stand-by mode.

At 70 is shown a conventional DC power supply such as 12 volts from an AC line having a grounded output 71 to supply 12 volts to power lead 54.

It is preferable to provide means independent of operation of unit 111 for resetting the control unit to its initial standby condition whenever a series of events has been commenced in control unit 11 by operation of unit 111, and the signal is lost or otherwise fails to complete a sequence of operation for a normal conversation. For this purpose a pair of normally-open slow-closing relays are provided with connections to lines 68 and 69. Lead 72 extends from line 68, corresponding to the first position of stepping switch actuation, to a coil 73 arranged to operate in a period of time such as 30 seconds to close a set of contacts 74 for applying voltage from line 68 to a line 64 connected to reset coil 63. Thus, if a call is initiated and relay 60 is on position 1 for 30 seconds the stepping relay will be returned to its normal off position. Similarly, when a conversation has been commenced and has been in progress for some time by virtue of wiper 66 being on contact 2 thus energizing line 69 and the transmitter via diode 80, lead 76 applies voltage from line 69 to coil 78 to close a pair of contacts 77 after a suitable time delay. This interval may be selected, for example, at three minutes in order to reset the control unit if the resetting operation has not been accomplished by way of a first tone control pulse generated by a line-clearing operation of switch 121.

Employing the previously described circuitry it will be seen that an incoming signal on line 10 passes through the normally closed contacts of relay 20 and the normally closed contacts of dial relay driver 30 to provide energization for relay Re 5 thus actuating the ringing audio oscillator to supply a ringing signal to the transmitter while the transmitter is energized by supply voltage on line 54 through closed contacts of Re 5 via diode 83 and line 81. The user of the remote unit, upon hearing this tone, then sets the switch 121 forward to its position 2 a first time to step relay 60 one step. A second step is required. He may then return switch 121 to its normal position or pass it to position 3 and thence back to position 1 whereby a second pulse is produced at switch 49 as the first tone is produced a second time. This steps relay 60 to the second position which connects the transmitter of unit 11 to line 10 and permits a normal conversation as long as switch banks 66 and 67 remain on position 2. Since the user has returned switch 121 to its initial position his microphone is connected directly to the audio input for his transmitter and a two-way talk mode channel to line 10 is completed. Upon termination of the conversation he may again actuate switch 121 to provide another pulse for stepping relay 60 one more step which then resets to its off or home position. If this third stepping by way of switch 49 does not occur within the time limit imposed by slow-to-make contacts 77 a resetting pulse is provided by the automatic reset delay and the user's extension phone is disconnected from the line. Control unit 11 is then in a stand-by condition for further actuation either by an incoming call on line 10, or by a call initiated by unit 111.

It will be seen that the user of unit 111 has complete control of the control unit 11 and of the telephone line for received and outgoing calls. A call initiated from the extension phone requires first that the user move switch 121 to position 2 which generates the first tone and this tone operates resonant reed circuit 40 closing switch 49. This immediately steps switch 60 to position 1 energizing line 68 and also operating dial driver relay 30 to connect lines a and b at switch contacts 39 and to break the ringing circuit through point K, thus preventing interference with dialing by the user's unit. At the same time a resetting time interval is commenced by the energizing coil 73. The duration of the first tone is normally a few seconds or less before switch 121 is advanced to position 3 at which time the second tone is generated to provide dialing pulses. Since circuit 40 is not sensitive to this second frequency, and dial relay driver 30 is enabled by application of power supply thereto via line 68 both the first and the second tones are effective to close the switch 39 normally open contacts and open the circuit through K. This is the condition for applying a line acquisition signal to line 10 and a pulse will be repeated as often as the second tone is interrupted by operation of switch 130. When a series of pulses corresponding to each operation of actuator 131 has occurred switch 121 is then returned to its initial position by way of position 2 to again pulse circuit 40 closing switch 49 and stepping relay 60 to position 2 to disconnect the outgoing ringing circuit from line 10 and connect the control unit in the talk mode through lines c and d and the automatic volume control circuit 50 to provide an audio input for transmitter 15 by way of line 51. The talk mode obviously includes data as well as voice communications, substituting other inputs and receivers.

As thus described means for controlling the ringing at the remote unit is operative automatically, unless a sequence has already commenced at the remote unit, and upon responding the user switches his control unit line connector and his own mobile unit to the talk mode by merely operating a switch through two steps and return. He may terminate the talk mode by one more step of his local switch, and thus return his unit to the receive mode for incoming calls. He has complete control of the coupler to a telephone line by positioning his mode switch or repeatedly operating it to position 2, and he may dial any outgoing call as though he were at a normally operating subscriber's station on a telephone line. These control operations are effected without the necessity of transmitting any kind of a control signal during the talk mode, since all switching is done before and after the talk mode. An outgoing or incoming call may be initiated in a few seconds elapsed time, not much different from the time for conventional subscriber phone operation, and no other attendant is required. Band width on the line is not changed and band width of transmission to the control unit is only the normal audio band width within which control tone modulations are nearly central, and minimum requirements are imposed on the radio spectrum by many users in the same locality. Interference between the user's transmitter and the control unit transmitter is not of importance since each uses its own narrow band of frequency, tuned as may be desired.

Land lines using a carrier wave modulated by voice or by digital or analogue information may be substituted for the radio coupling above described, and it is contemplated that a number of data phones may be used from the same control unit by suitable tuning of units to the respective carrier frequencies.

I claim:

1. Extension telephone apparatus for connecting a mobile telephone to a telephone line at a subscriber's station, comprising:

mobile transmitter and receiver means including a means for transmitting first and second tones alternatively and for connecting transmitter and receiver elements in the talk mode, control unit means at said station for receiving said transmitted tones and transmitting to the mobile receiver signals on said line, filter switch means operable in response to receipt of said first tone, stepping switch means response to operation of said filter switch means, having first, second and third operated positions, means connected to said first position for applying to said line dialing pulses according to intervals during which said second tone is received, means connected to said second position for energizing transmitting means in said control unit and for connecting said line to last said transmitter means, means connected to said third position for resetting said stepping switch means to nonoperated position, and means in said control unit for generating ringing signals for transmission to said mobile means in response to ringing signals on said line.

2. Apparatus according to claim 1 said transmitter and receiver means comprising:

means in said extension unit for selectively generating for transmission a first frequency switching mode modulation signal and a second frequency dialing mode modulation signal, means in said extension unit for applying voice mode acoustic signals as a modulating signal when neither the switching mode nor the dialing mode signal is transmitted, switching means in said extension unit for selecting either of said generated signals or said voice signal in accordance with said modes, and means in said fixed station for detecting each occurrence of said switching signals and for thereupon completing a corresponding coupling to a telephone line, according to one of said modes.

3. In a system according to claim 2, said detecting means comprising tone selective filter means for operating a switch whenever a tone corresponding to said switching signal is generated, a switch operably connected to said tone selective filter means and operatively connected to further means in said fixed station for controlling the interconnection of the transmitter and receiver therein with said line for conveying signals to and from the extension unit according to the selected mode.

4. In a system according to claim 2, said detecting means including switch means responsive to said switching signal for connecting said fixed station transmitting and receiving means to said line in accordance with mode selected at the extension unit.

5. In a system according to claim 2, means at said fixed station for switching according to said modes comprising a stepping switch having a normal position and a plurality of operated positions, one said operated position being connected to enable circuit means for pulsing said line according to said dialing mode signal and another operated position being connected to couple fixed station transmitter and receiver means to said line whereby said extension unit is coupled to said line in a talk mode.

6. In a system according to claim 5, relay means connected responsively to said fixed station receiver when said stepping switch is on said one position, said relay having closed contacts connected across said line when actuated by a ringing signal.

7. In a system according to claim 5, means at said fixed station to disconnect fixed station transmitter from its battery during dialing mode, when said stepping switch steps to the dial circuit position.

8. Extension telephone apparatus for receiving and initiating calls from a subscriber's station under control of a mobile telephone unit, comprising:

mobile unit means for transmitting to and receiving from said station voice and ring signals, mobile unit tone generator means for alternatively producing first and second tones, means for applying said tones when produced to cause transmission thereof to said station, means in said mobile unit for interrupting one of said tones when produced according to a dialing code, mobile unit means for operating said tone generator to produce at the operator's election said first or said second tone and for disabling the tone generator during desired intervals of telephone reception from said station, subscriber's station means for receiving transmission from said mobile unit, telephone line control means responsive to receipt of said first tone for coupling the receiving means to a telephone line during a first interval, said coupling means including means for coupling a dialing code signal to the line and for coupling said line to station transmitting means during a second interval, station transmitting means for conveying signals received to said mobile unit, and means for coupling said line to said station transmitting means during a third interval in response to receipt of two pulses of said first tone, said control means including a stepping switch connected to couple the line to the station transmitter in one position of advancement and to couple outgoing ringing signals to the line in another position of advancement, and including a third position having automatic resetting means coupled therethrough.

9. Apparatus according to claim 8 said station including filter switch means operative only when said first tone is received to advance said stepping switch by one position each time the tone is received.

10. Apparatus according to claim 8 operative when said stepping switch is not advanced to couple incoming ringing signals to said station transmitter.

*11. Extension telephone apparatus for remotely using a telephone line at a subscriber's station comprising:*

*a mobile unit including:*

*mobile transmitter means,*

*mobile receiver means;*

*tone means for alternatively generating a first tone and a second tone; and*

*selector means for selectively connecting said tone means to said mobile transmitter means to cause said tones generated by said tone means to be transmitted through said mobile transmitter means; and,*

*a control unit at the subscriber's station including:*

*control transmitter means for transmitting to said mobile receiver means signals on said telephone line;*

*control receiver means for receiving said first and second tones transmitted by said mobile transmitter means;*

*filter switch means connected to said control receiver means and operable in response to receipt of said first tone;*

*stepping switch means responsive to operation of said filter switch means having normal, first and second operated positions;*

*ringing circuit means operatively associated with said normal position of said stepping switch means and said control transmitter means for generating ringing signals in response to ringing signals on the telephone line and causing said control transmitter means to transmit said generated ringing signals;*

*dialing means operatively associated with said first position of said stepping switch means for applying dialing pulses to the telephone line in response to receipt of said second tone by said control receiver; and*

*talk means operatively associated with said second position of said stepping switch means for connecting said control transmitter means to the telephone line and energizing said control transmitter means.*

*12. The apparatus of claim 11 wherein said ringing circuit means includes:*

*light emitting means electrically connected to the telephone line constructed and arranged to be illuminated in response to ringing signals on the telephone line; and,*

*a photocell optically associated with said light emitting means constructed and arranged to cause an electrical signal output to be generated in response to illumination of said light emitting means, the ringing signals on the telephone line being electrically isolated from the electrical signal output of said photocell.*

*13. The apparatus of claim 12 wherein said light emitting means includes a neon bulb.*

*14. The apparatus of claim 13 wherein said ringing circuit means further includes:*

*oscillator means for generating an oscillating output signal when energized, said output of said oscillator means operatively connected to said control transmitter means; and*

*ringing switch means operatively connected to the electrical signal output of said photocell, said oscillating means and said transmitter means to cause said oscillator means to generate the oscillating output signal and said control transmitter means to transmit said oscillating output signal to said mobile unit when said neon bulb is illuminated.*

*15. The apparatus of claim 11 wherein said selector means in said mobile unit is effective to cause said filter switch means in said control unit to operate said stepping switch means in said control unit and selectively cause said stepping switch means to assume said normal, first or second positions.*

*16. The apparatus of claim 15 wherein said stepping switch means is sequentially stepped between said normal, first and second positions with said switch means stepping to the next of said operated positions in response to each receipt of said first tone by said filter switch means.*

* * * * *